(12) United States Patent
Liu et al.

(10) Patent No.: US 12,484,306 B2
(45) Date of Patent: Nov. 25, 2025

(54) DISPLAY PANEL AND DISPLAY DEVICE (71) Applicant: TCL CHINA STAR OPTOELECTRONICS TECHNOLOGY CO., LTD., Guangdong (CN)

(72) Inventors: Yingying Liu, Guangdong (CN); Jianjian Ying, Guangdong (CN)

(73) Assignee: TCL CHINA STAR OPTOELECTRONICS TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 17/755,282

(22) PCT Filed: Apr. 13, 2022

(86) PCT No.: PCT/CN2022/086586
§ 371 (c)(1),
(2) Date: Apr. 26, 2022

(87) PCT Pub. No.: WO2023/184576
PCT Pub. Date: Oct. 5, 2023

(65) Prior Publication Data
US 2024/0170501 A1    May 23, 2024

(30) Foreign Application Priority Data
Mar. 30, 2022 (CN) .......................... 202210333018.8

(51) Int. Cl.
*H10D 86/60* (2025.01)
*H10D 86/40* (2025.01)

(52) U.S. Cl.
CPC ........... *H10D 86/60* (2025.01); *H10D 86/443* (2025.01)

(58) Field of Classification Search
CPC ...... H10D 86/443; H10K 50/841–8428; H01L 23/564
See application file for complete search history.

(56) References Cited

U.S. PATENT DOCUMENTS

| 12,164,198 B2 * | 12/2024 | Nishino ................. G02F 1/1339 |
| 2006/0139505 A1 * | 6/2006 | Yoshinaga ............. G02F 1/1345 349/43 |
| 2007/0291216 A1 | 12/2007 | Chan et al. |
| 2014/0016070 A1 * | 1/2014 | Choi ..................... G02F 1/1339 349/139 |

(Continued)

FOREIGN PATENT DOCUMENTS

| CN | 104777679 A | 7/2015 |
| CN | 107544175 A | 1/2018 |

(Continued)

*Primary Examiner* — Steven B Gauthier
*Assistant Examiner* — E. Rhett Cheek (57) ABSTRACT

The present application provides a display panel and a display device. The display panel includes a first substrate, a second substrate disposed opposite to the first substrate, and a sealant layer. The first substrate includes a first base, signal lines, and an insulating layer. The first substrate includes a first groove structure extending through the insulating layer in a thickness direction. One side of the sealant layer away from the second substrate extends into the first groove structure and is attached to the first base.

12 Claims, 3 Drawing Sheets

(56) References Cited

U.S. PATENT DOCUMENTS

| | | | | |
|---|---|---|---|---|
| 2014/0043574 A1* | 2/2014 | Ichimura | ............... | G02F 1/1339 |
| | | | | 349/138 |
| 2015/0185516 A1* | 7/2015 | Lee | ................... | G02F 1/133512 |
| | | | | 349/110 |
| 2018/0120604 A1* | 5/2018 | Seok | ...................... | G02F 1/1345 |
| 2018/0159070 A1* | 6/2018 | He | ........................ | H10K 59/12 |
| 2019/0004345 A1* | 1/2019 | Jiang | ...................... | G02B 27/00 |
| 2019/0393443 A1* | 12/2019 | Chen | ................. | H10K 59/1315 |
| 2023/0060342 A1* | 3/2023 | Yang | ..................... | G09G 3/3677 |
| 2025/0056975 A1* | 2/2025 | Oh | ......................... | H10K 71/221 |
| 2025/0216732 A1* | 7/2025 | Kim | ....................... | G02F 1/1339 |

FOREIGN PATENT DOCUMENTS

| | | | | | |
|---|---|---|---|---|---|
| CN | 108398835 A | | 8/2018 | | |
| CN | 109541825 A | * | 3/2019 | ........... | G02F 1/1303 |
| CN | 110687732 A | | 1/2020 | | |
| CN | 209911704 U | * | 1/2020 | | |
| CN | 110824785 A | | 2/2020 | | |
| CN | 111244039 A | | 6/2020 | | |
| CN | 113219737 A | | 8/2021 | | |
| CN | 113687533 A | | 11/2021 | | |
| CN | 113867025 A | | 12/2021 | | |

* cited by examiner

DISPLAY PANEL AND DISPLAY DEVICE

FIELD OF DISCLOSURE

The present application relates to a field of display technology, and in particular, to a display panel and a display device.

DESCRIPTION OF RELATED ART

With the development of display technology, narrow-bezel display products have received extensive attention.

Figure 1:
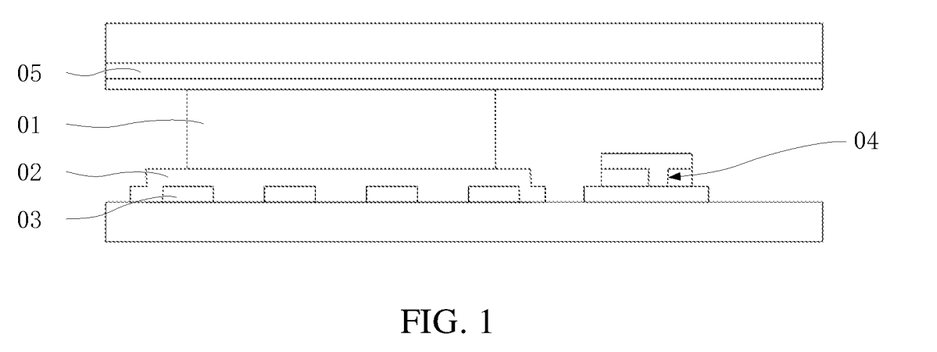
FIG. 1 is a schematic structural view of a conventional display panel.
Figure 2:
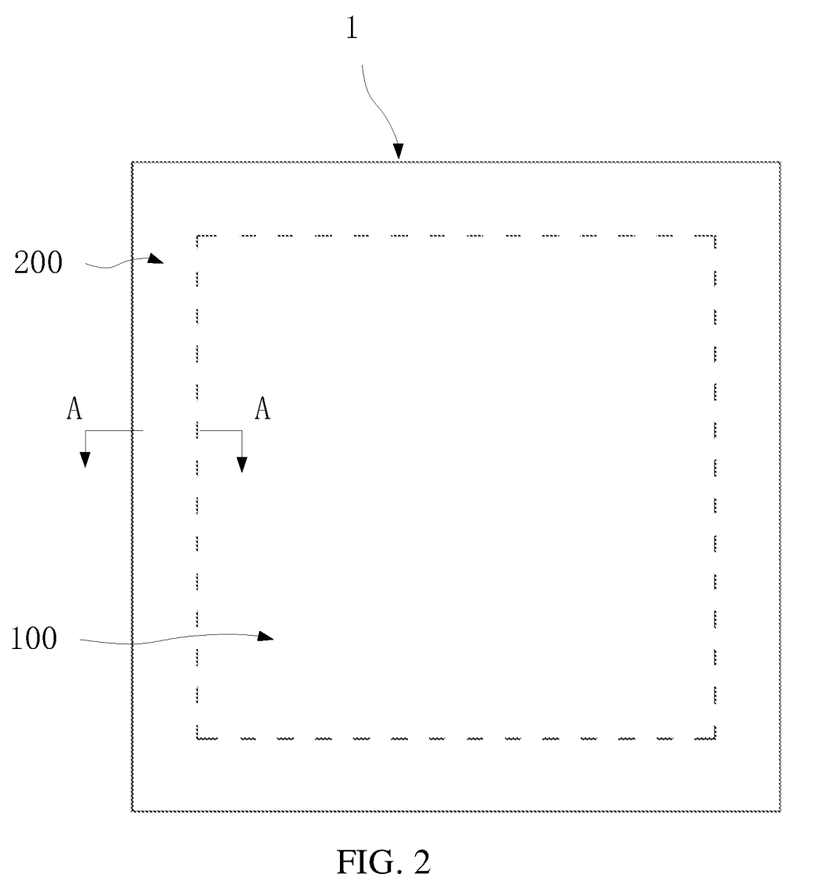
FIG. 2 is a top view of a display panel according to one embodiment of the present application.

At present, in narrow-bezel display panels, there are design requirements for making narrow bezels, so a width of a sealant frame is less, which reduces sealing performance of the sealant frame. As shown in FIG. 1, in sealing reliability tests, moisture can easily enter from between an insulating material layer and a metal trace layer at a position of the sealant frame, causing the metal trace layer to corrode at positions where electrical connection is made through via holes in the insulating material layer, and resulting in a problem of horizontal dense lines appearing during display operations of the display panel.

SUMMARY

The present application provides a display panel and a display device to solve a technical problem that moisture easily enters from between an insulating material layer and a metal trace layer at a position of a sealant frame of a narrow-bezel display panel.

The present application provides a display panel, including:
- a first substrate including a first base, a plurality of signal lines disposed on the first base,
- and an insulating layer disposed on one side of the signal lines away from the first base;
- a second substrate disposed opposite to the first substrate; and
- a sealant layer disposed between the first substrate and the second substrate;
- wherein the first substrate includes a first groove structure extending through the insulating layer in a thickness direction of the insulating layer, and one side of the sealant layer away from the second substrate extends into the first groove structure and is attached to the first base.

In the present application, the first groove structure extending through the insulating layer is disposed in the first substrate, and one side of the sealant layer away from the second substrate extends into the first groove structure, thereby blocking a moisture passage between the insulating layer and each signal lines, preventing moisture from entering the display panel from between the insulating layer and each signal line, and improving sealing performance of the display panel.

In the display panel of the present application, the first groove structure includes a plurality of first grooves, the first grooves are located between the signal lines, and the sealant layer includes a plurality of first filling portions disposed in the plurality of first grooves.

In the present embodiment, the moisture passage between the insulating layer and each signal line is blocked by the first filling portions, thus preventing moisture from entering the display panel from between the insulating layer and the signal line, which improves the sealing performance of the display panel. Obviously, a material of the first filling portions is a material of a sealant frame. The first filling portions are disposed in the first grooves, that is, the first filling portions are directly bonded to the first base. Accordingly, a contact area between the sealant layer and the first substrate increases, which not only improves the sealing performance of the display panel, but also ensures bonding stability between the sealant layer and the first substrate.

In the display panel of the present application, wherein a width of one of the first grooves is equal to an interval between two corresponding adjacent signal lines, and the first filling portions are disposed in the first grooves and in contact with and connected to lateral sides of the signal lines.

In the present embodiment, the width of the first groove is set to be equal to the interval between the corresponding two adjacent signal lines. That is to say, a portion of the insulating layer located between the adjacent two adjacent signal lines is completely patterned to form the first groove, which maximizes the width of the first groove, increases a width of the first filling portion, enables the first filling portion to better block the moisture passage between the insulating layer and each signal line, and also increases an overall contact area between the sealant layer and the first substrate.

In the display panel of the present application, the first groove structure includes the plurality of first grooves, and each of the first grooves is disposed between two adjacent signal lines.

In the present embodiment, one of the first grooves is defined between any two adjacent signal lines. That is to say, the first grooves are defined as many as possible in the insulating layer, and the filling portion between each two adjacent signal lines can prevent entry of moisture.

In the display panel of the present application, the first groove structure includes a plurality of second grooves, an orthographic projection of each of the signal lines projected on the first base covers an orthographic projection of one of the second grooves projected on the first base, and the sealant layer includes a plurality of second filling portions disposed in the plurality of second grooves.

In the present embodiment, the second grooves are defined in the insulating layer above the signal lines. The second grooves extend through the insulating layer, so that the second filling portions disposed in the second grooves are directly bonded to the signal lines, thereby blocking the moisture passage between the insulating layer and each signal line to improve the sealing performance of the display panel.

In the present embodiment, the second substrate includes a second base and a light shielding layer disposed on one side of the second base close to the first substrate; and
 wherein the second substrate includes a second groove structure disposed in the light shielding layer, and one side of the sealant layer away from the first substrate extends into the second groove structure and is attached to the second base.

In the present embodiment, the second groove structure is disposed in the light shielding layer to reduce a thickness of the light shielding layer at a position of the second groove structure, thereby blocking a passage where moisture can enter from the light shielding layer.

In the display panel of the present application, the second groove structure includes a plurality of third grooves, the plurality of third grooves extend through the light shielding layer in a thickness direction of the light shielding layer, and the sealant layer includes a plurality of third filling portions disposed in the plurality of third grooves; and an orthographic projection of each of the signal lines projected on the second base covers an orthographic projection of one of the third grooves projected on the second base.

In the present embodiment, the third filling portions are disposed in the third grooves to block a moisture passage at a position of the light shielding layer, thereby further improving the sealing performance of the display panel. Moreover, since the present application arranges the third grooves in an area covered by the signal lines, the backlight is shielded by the signal lines, thereby preventing light leakage of the display panel.

In the display panel of the present application, the second groove structure includes a plurality of fourth grooves, a depth of each of the fourth grooves is less than a thickness of the light shielding layer, and the sealant layer includes a plurality of fourth filling portions disposed in the plurality of fourth grooves.

In the display panel of the present application, an orthographic projection of the fourth grooves projected on the second base does not overlap with the orthographic projection of the signal lines projected on the second base.

In the present application, besides disposing the third grooves in the light shielding layer, the second groove structure includes the plurality of fourth grooves in the sealant sub-region, the depth of the fourth groove is less than the thickness of the light shielding layer, and the sealant layer includes a plurality of fourth filling portions disposed in the plurality of fourth grooves. By arranging the fourth grooves, the thickness of the light shielding layer is reduced, thereby reducing a risk of forming the moisture passage at the light shielding layer.

In the display panel of the present application, the second substrate includes a second base, a light shielding layer disposed on one side of the second base close to the first substrate, and a metal layer disposed on one side of the light shielding layer close to the first substrate; and
wherein the second substrate includes a second groove structure arranged in the light shielding layer, the metal layer extends into the second groove structure and is attached to the second base, the metal layer includes a plurality of concave portions disposed in the second groove structure, and one side of the sealant layer away from the first substrate extends into the plurality of concave portions and is attached to the metal layer. In the present embodiment, by having the concave portions of the metal layer and filling the sealant layer into the concave portions, the present application reduces a risk of moisture intrusion from the light shielding layer.

Accordingly, the present application further provides a display device, including a display panel and a backlight module combined with the display panel, wherein the display panel includes:
a first substrate including a first base, a plurality of signal lines disposed on the first base, and an insulating layer disposed on one side of the signal lines away from the first base;
a second substrate disposed opposite to the first substrate; and
a sealant layer disposed between the first substrate and the second substrate;
wherein the first substrate includes a first groove structure extending through the insulating layer in a thickness direction of the insulating layer, and one side of the sealant layer away from the second substrate extends into the first groove structure and is attached to the first base.

In the display device of the present application, the first groove structure includes a plurality of first grooves, the first grooves are located between the signal lines, and the sealant layer includes a plurality of first filling portions disposed in the plurality of first grooves.

In the display device of the present application, a width of one of the first grooves is equal to an interval between two corresponding adjacent signal lines, and the first filling portions are disposed in the first grooves and in contact with and connected to lateral sides of the signal lines.

In the display device of the present application, the first groove structure includes the plurality of first grooves, and each of the first grooves is disposed between two adjacent signal lines.

In the display device of the present application, the first groove structure includes a plurality of second grooves, an orthographic projection of each of the signal lines projected on the first base covers an orthographic projection of one of the second grooves projected on the first base, and the sealant layer includes a plurality of second filling portions disposed in the plurality of second grooves.

In the display device of the present application, the second substrate includes a second base and a light shielding layer disposed on one side of the second base close to the first substrate; and
wherein the second substrate includes a second groove structure disposed in the light shielding layer, and one side of the sealant layer away from the first substrate extends into the second groove structure and is attached to the second base.

In the display device of the present application, the second groove structure includes a plurality of third grooves, the plurality of third grooves extend through the light shielding layer in a thickness direction of the light shielding layer, and the sealant layer includes a plurality of third filling portions disposed in the plurality of third grooves; and
an orthographic projection of each of the signal lines projected on the second base covers an orthographic projection of one of the third grooves projected on the second base.

In the display device of the present application, the second groove structure includes a plurality of fourth grooves, a depth of each of the fourth grooves is less than a thickness of the light shielding layer, and the sealant layer includes a plurality of fourth filling portions disposed in the plurality of fourth grooves.

In the display device of the present application, an orthographic projection of the fourth grooves projected on the second base does not overlap with the orthographic projection of the signal lines projected on the second base.

In the display device of the present application, the second substrate includes a second base, a light shielding layer disposed on one side of the second base close to the first substrate, and a metal layer disposed on one side of the light shielding layer close to the first substrate; and
wherein the second substrate includes a second groove structure arranged in the light shielding layer, the metal layer extends into the second groove structure and is attached to the second base, the metal layer includes a plurality of concave portions disposed in the second groove structure, and one side of the sealant layer away from the first substrate extends into the plurality of concave portions and is attached to the metal layer.

Advantages of the Present Application:

In the present application, the first groove structure extending through the insulating layer is disposed in the first substrate, and one side of the sealant layer away from the second substrate extends into the first groove structure, thereby blocking a moisture passage between the insulating layer and each signal lines, preventing moisture from entering the display panel from between the insulating layer and each signal line, and improving the sealing performance of the display panel.

BRIEF DESCRIPTION OF DRAWINGS

In order to more clearly illustrate the embodiments of the present disclosure or related art, figures which will be described in the embodiments are briefly introduced hereinafter. It is obvious that the drawings are merely for the purposes of illustrating some embodiments of the present disclosure, and a person having ordinary skill in this field can obtain other figures according to these figures without inventive work.

DETAILED DESCRIPTION OF EMBODIMENTS

The present application is described below with reference to accompanying drawings and with respect to various embodiments. Directional terms mentioned in the present invention, such as "up", "down", "front", "rear", "left", "right", "inner", "outer", and "side", are only for illustrative purposes based on directions in the accompanying drawings. Therefore, the directional terms are for describing and understanding the present invention, not for limiting the present invention. In the drawings, structurally similar components are denoted by the same reference numerals.

In the description of the present application, it should be understood that the terms "first" and "second" are only used for illustrative purposes, and cannot be interpreted as indicating or implying relative importance or implicitly indicating the number of indicated technical features. Thus, for features with wordings like "first" and "second", the present application can expressly or implicitly include one or more of said features. In the description of the present application, "multiple" means two or more, unless otherwise expressly and specifically defined.

In the description of the present application, it should be noted that, unless otherwise expressly specified and defined, terms such as "installed", "connected" and "coupled" should be understood in a broad sense, for example, elements can be fixedly connected or detachably connected, or elements can be connected in an integral form; elements can have a mechanical or electrical connection relationship, or elements can communicate with each other; and elements can be directly connected or indirectly connected through an intermediate medium, or elements can have inner spaces communicating with each other, or elements can react with each other. For those of ordinary skill in the art, specific meanings of the above terms in the present application can be understood according to actual conditions.

Technical solutions of the present application are described with reference to specific embodiments.

Referring to FIGS. 2 to 5, the present application provides a display panel and a display device. Each embodiment of the present application is described in detail below. It should be noted that a description order of the following embodiments is not intended to limit a preferable order of the embodiments.

Referring to FIGS. 2 to 6, the present application provides a display panel 1 including a display area 100 and a non-display area 200 adjacent to the display area 100. The non-display area 200 includes a sealant sub-area 300. The display panel 1 includes:

a first substrate 10 including a first base 11, a plurality of signal lines 12 disposed on the first base 11 and at least partially located in the sealant sub-region 300, and an insulating layer 13 disposed on one side of the signal lines 12 away from the first base 11;

a second substrate 20 disposed opposite to the first substrate 10; and a sealant layer 30 disposed between the first substrate 10 and the second substrate 20 and located in the sealant sub-region 300;

wherein the first substrate 10 includes a first groove structure extending through the insulating layer 13 in a thickness direction the insulating layer 13 and is located in the sealant sub-region 300, and one side of the sealant layer 30 away from the second substrate 20 extends into the first groove structure and is attached to the first base 11.

It is understood that conventional narrow-bezel display panels have design requirements for narrow bezels, so a width of a sealant frame is less, which reduces a sealing effect of the sealant frame. As shown in FIG. 1, in sealing reliability tests, moisture can easily enter from between an insulating material layer 02 and a metal trace layer 03 at a position of a sealant frame 01, causing the metal trace layer 03 to corrode at a position where electrical connection is made through a via hole 04 in the insulating material layer 02. In the embodiment of the present application, by having the first groove structure in the first substrate 10 extending through the insulating layer 13, and having the sealant layer 30 extending from one side of the sealant layer 30 away from the second substrate 20 into the first groove structure and attached to the first base 11, the present application blocks a moisture passage between the insulating layer 13 and the signal lines 12, preventing moisture from entering from between the insulating layer 13 and the signal line 12 into the display panel 1, and improving sealing performance of the display panel 1.

It should be noted that, in forming the first groove structure in the insulating layer 13, a photo-mask design in a patterning process of fabricating the insulating layer 13 can be adjusted to form the first groove structure in the insulating layer 13 without extra manufacturing steps.

Referring to FIGS. 3 to 6, in some embodiments, the first groove structure includes a plurality of first grooves 131 in the sealant sub-region 300. The first grooves 131 are located between the signal lines 12, and the sealant layer 30 includes a plurality of first filling portions 31 disposed in the plurality of first grooves 131.

It can be understood that the first grooves 131 are located between the signal lines 12 and are used to block the insulating layer 13 in positions between the signal lines 12.

The sealant layer 30 includes the first filling portions 31 disposed in the first grooves 131. The first filling portions 31 block a moisture passage between the insulating layer 13 and the signal lines 12, thereby preventing moisture from entering the display panel 1 from between the insulating layer 13 and the signal lines 12, which improves the sealing performance of the display panel 1. Obviously, a material of the first filling portions 31 is a material of the sealant frame 01. The first filling portions 31 are disposed in the first grooves 131, that is, the first filling portions 31 are directly bonded to the first base 11. Accordingly, an overall contact area between the sealant layer 30 and the first substrate 10 increases, which not only improves the sealing performance of the display panel 1, but also ensures bonding stability between the sealant layer 30 and the first substrate 10.

Figure 4:
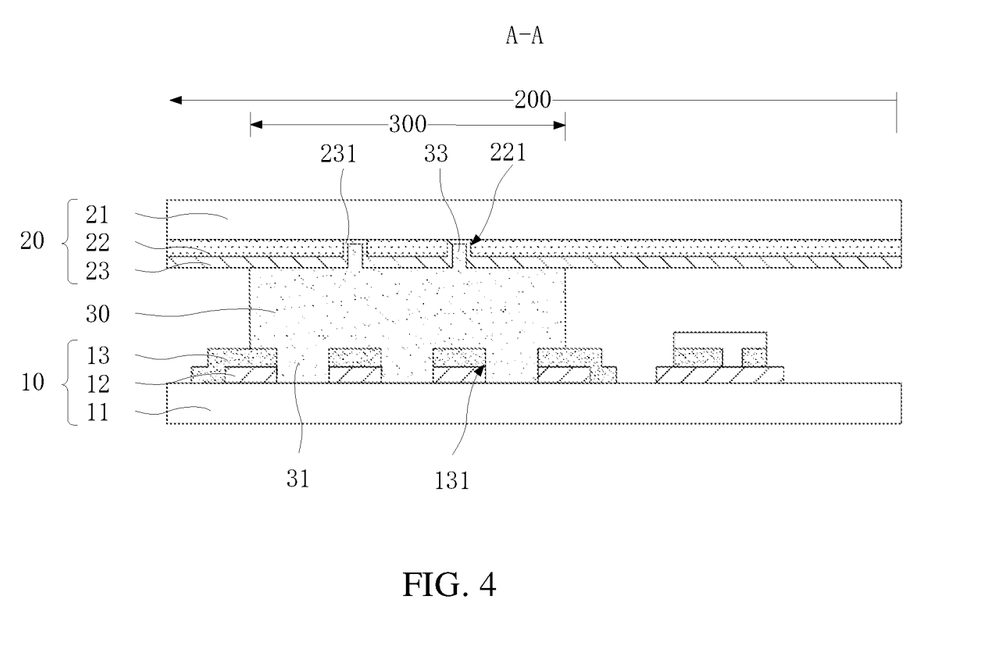
FIG. 4 is a cross-sectional view taken along line A-A of FIG. 2 according to a second embodiment of the present application.
Figure 5:
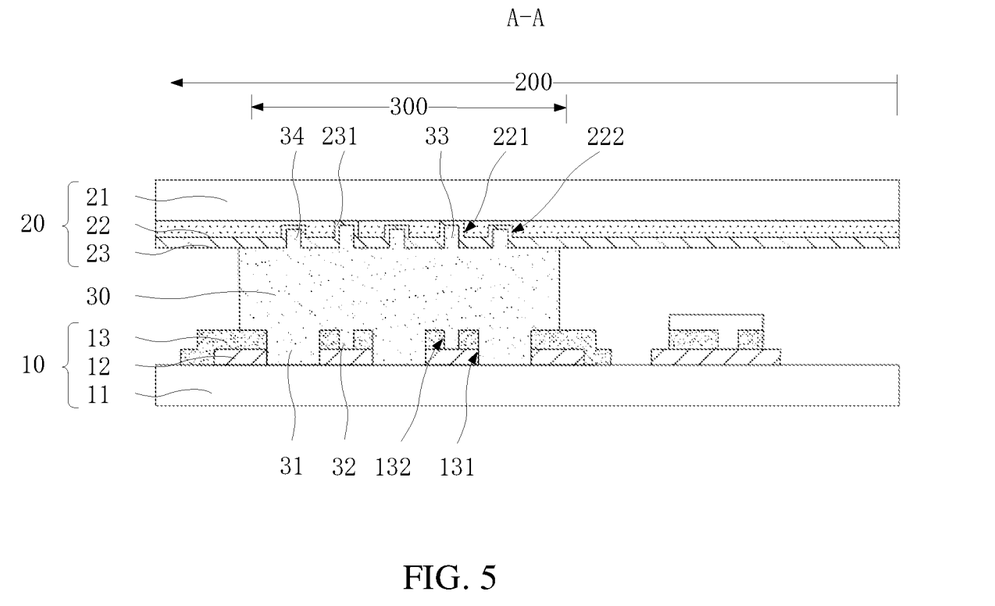
FIG. 5 is a cross-sectional view taken along line A-A of FIG. 2 according to a third embodiment of the present application.
Figure 6:
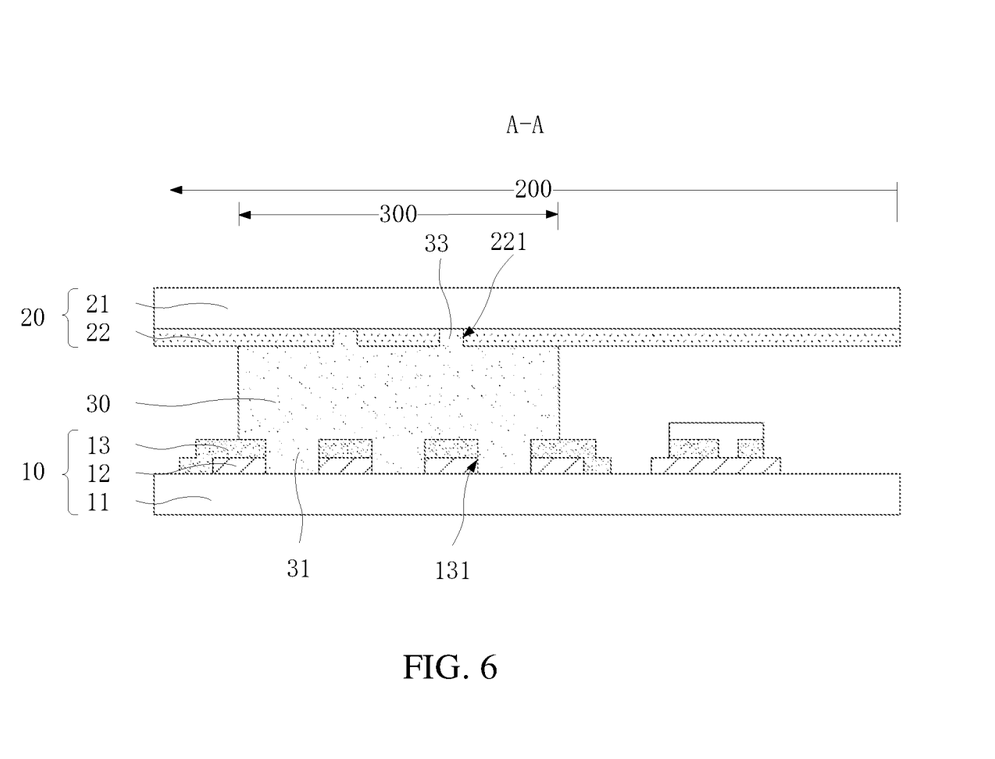
FIG. 6 is a cross-sectional view taken along line A-A of FIG. 2 according to a fourth embodiment of the present application.

In some embodiments, please refer to FIG. 4 to FIG. 6, a width of each first groove 131 is equal to an interval between the corresponding two adjacent signal lines 12. The first filling portions 31 are disposed in the first grooves 131 and in contact with lateral sides of the signal lines 12.

It can be understood that the width of the first groove 131 is set to be equal to the interval between the corresponding two adjacent signal lines 12. That is to say, a portion of the insulating layer 13 located between the adjacent two adjacent signal lines 12 is completely patterned to form the first groove 131, which maximizes the width of the first groove 131, increases a width of the first filling portion 31, enables the first filling portion 31 to better block the moisture passage between the insulating layer 13 and each signal line 12, and also increases an overall contact area between the sealant layer 30 and the first substrate 10.

Referring to FIG. 3 to FIG. 6, in some embodiments, the first groove structure includes the plurality of first grooves 131. In the sealant sub-region 300, one of the first grooves 131 is defined between any two adjacent signal lines 12.

It can be understood that the first groove structure includes the first grooves 131. In the sealant sub-region 300, one of the first grooves 12 is defined between any two adjacent signal lines 12. That is to say, the first grooves 131 are defined as many as possible in the insulating layer 13, and the filling portion between each two adjacent signal lines 12 can prevent entry of moisture.

Referring to FIG. 5, in some embodiments, the first groove structure includes a plurality of second grooves 132 in the sealant sub-region 300. An orthographic projection of the signal lines 12 projected on the first base 11 covers an orthographic projection on the upper surface covers an orthographic projection of the second grooves 132 projected on the first base 11, and the sealant layer 30 includes a plurality of second filling portions 32 disposed in the plurality of second grooves 132.

It can be understood that the first groove structure includes at least one second groove 132 located in the sealant sub-region 300, and the orthographic projection of the signal lines 12 projected on the first base 11 covers the orthographic projection of the second grooves 132 projected on the first base 11. That is to say, the second grooves 132 are defined in the insulating layer 13 above the signal lines 12. The second grooves 132 extend through the insulating layer 13, so that the second filling portions 32 disposed in the second grooves 132 are directly bonded to the signal lines 12, thereby blocking the moisture passage between the insulating layer 13 and each signal line 12 to improve the sealing performance of the display panel 1.

Figure 3:
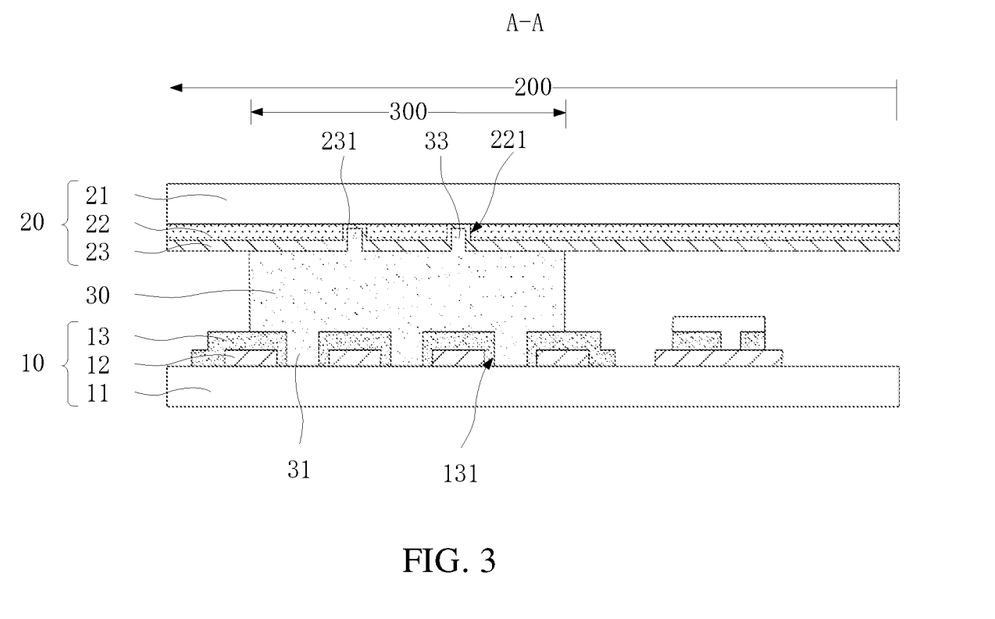
FIG. 3 is a cross-sectional view taken along line A-A of FIG. 2 according to a first embodiment of the present application.

Referring to FIGS. 3 to 5, in some embodiments, the second substrate 20 includes a second base 21 and a light shielding layer 22 disposed on one side of the second base 21 close to the first substrate 10;

wherein the second substrate 20 includes a second groove structure arranged in the light shielding layer 22 and located in the sealant sub-region 300, and the one side of sealant layer 30 away from the first substrate 10 extends into the second groove structure and is attached to the second substrate 20.

It can be understood that in conventional narrow-bezel display panel 1, due to the design requirements for the narrow bezels, the width of the sealant frame 01 is less, which reduces the sealing effects of the sealant frame 01. As shown in FIG. 1, in sealing reliability tests, since a material of a black matrix 05 in a color filter layer has water absorption, it is easier to form a moisture passage at a position of the black matrix 05, which reduces sealing reliability of the display panel 1. However, in the present embodiment, the second groove structure is disposed in the light shielding layer 22 to reduce a thickness of the light shielding layer 22 at a position of the second groove structure, thereby reducing a risk of entry of moisture from the light shielding layer 22. Specifically, the light shielding layer 22 can be made of a black color resist material.

Referring to FIGS. 3 to 5, in some embodiments, the second groove structure includes a plurality of third grooves 221 in the sealant sub-region 300, the third grooves 221 extend through the light shielding layer 22, and the sealant layer 30 includes a plurality of third filling portions 33 disposed in the plurality of third grooves 221; and an orthographic projection of the signal lines 12 projected on the second base 21 covers an orthographic projection of the third grooves 221 projected on the second base 21.

It can be understood that the second groove structure includes the plurality of third grooves 221 located in the sealant sub-region 300, and the third grooves 221 extend through the light shielding layer 22 so as to disconnect the light shielding layer at positions of the third grooves 221 to prevent moisture from entering from a position of the light shielding layer 22. The sealant layer 30 includes a plurality of third filling portions 33 disposed in the plurality of third grooves 221, the moisture passage at the position of the light shielding layer 22 is cut off by the third filling portions 33 disposed in the third grooves 221, thereby further improving the sealing performance of the display panel 1.

It should be noted that the orthographic projection of the signal lines 12 projected on the second base 21 covers the orthographic projection of the third grooves 221 projected on the second base 21. When the third grooves 221 extend through the light shielding layer 22, the light shielding layer 22 cannot shield light at the positions of the third grooves 221, which may cause light leakage of the display panel 1. In solution, the present application arranges the third grooves 221 in an area covered by the signal lines 12, the backlight is shielded by the signal lines 12, thereby preventing light leakage of the display panel 1.

Referring to FIG. 5, in some embodiments, the second groove structure includes a plurality of fourth grooves 222 in the sealant sub-region 300, and a depth of the fourth groove 222 is less than the thickness of the light shielding layer 22. The sealant layer 30 includes a plurality of fourth filling portions 34 disposed in the plurality of fourth grooves 222.

An orthographic projection of the fourth grooves 222 projected on the second base 21 does not overlap with the orthographic projection of the signal lines 12 projected on the second base 21.

It can be understood that, besides disposing the third grooves 221 in the light shielding layer 22, the second groove structure includes the plurality of fourth grooves 222 in the sealant sub-region 300, the depth of the fourth groove 222 is less than the thickness of the light shielding layer 22, and the sealant layer 30 includes a plurality of fourth filling portions 34 disposed in the plurality of fourth grooves 222. By arranging the fourth grooves 222, the thickness of the light shielding layer 22 is reduced, thereby reducing a risk of forming the moisture passage at the light shielding layer 22. Obviously, the depth of the fourth groove 222 is less than the thickness of the light shielding layer 22, so the light shielding layer 22 can still shield light at positions of the fourth grooves 222, and the orthographic projection of the fourth grooves 222 projected on the second base 21 does not overlap the orthographic projection of the signal lines 12 projected on the second base 21.

Referring to FIGS. 3 to 5, in some embodiments, the second substrate 20 includes a second base 21, a light shielding layer 22 disposed on one side of the second base 21 close to the first substrate 10, and a metal layer 23 on one side of the light shielding layer 22 close to the first substrate 10;

wherein the second substrate 20 includes a second groove structure arranged in the light shielding layer 22, the metal layer 23 extends into the second groove structure and is attached to the second base 21, and the metal layer 23 includes a plurality of concave portions 231 disposed in the second groove structure. One side of the sealant layer 30 away from the first substrate 10 extends into the plurality of concave portions 231 and is attached to the metal layer 23.

It can be understood that a thickness of the metal layer 23 is less than a depth of the second groove structure. The metal layer 23 forms the concave portions 231 in the second groove structure, and one side of the sealant layer 30 away from the first substrate 10 extends into the concave portions 231. By having the concave portions 231 of the metal layer 23 and filling the sealant layer 30 into the concave portions 231, the present application reduces a risk of moisture intrusion from the light shielding layer 22. Specifically, the metal layer 23 can be a common electrode layer, gold balls can be disposed in the sealant layer 30, and the common electrode layer can be connected to the signal lines 12 through the sealant layer 30 embedded with the gold balls.

The present application further provides a display device, the display device includes the display panel 1 described in any of the previous embodiments, and further includes a backlight module combined with the display panel.

In the present application, the first groove structure extending through the insulating layer 13 is disposed in the first substrate 10, and one side of the sealant layer 30 away from the second substrate 20 extends into the first groove structure, thereby blocking the moisture passage between the insulating layer 13 and each signal lines 12, preventing moisture from entering the display panel 1 from between the insulating layer 13 and each signal line 12, and improving the sealing performance of the display panel 1.

In summary, although the present invention has been disclosed above with preferable embodiments, the above preferable embodiments are not intended to limit the present invention. Those of ordinary skill in the art can make various changes and modifications. Therefore, the protection scope of the present invention is subject to the scope defined by the claims.

What is claimed is:

1. A display panel, comprising:
   a first substrate comprising a first base, a plurality of signal lines disposed on the first base, and an insulating layer disposed on one side of the signal lines away from the first base;
   a second substrate disposed opposite to the first substrate; and
   a sealant layer disposed between the first substrate and the second substrate;
   wherein the first substrate comprises a first groove structure extending through the insulating layer in a thickness direction of the insulating layer, and one side of the sealant layer away from the second substrate extends into the first groove structure and is attached to the first base;
   wherein the first groove structure comprises a plurality of second grooves, an orthographic projection of each of the signal lines projected on the first base covers an orthographic projection of one of the second grooves projected on the first base, and the sealant layer includes a plurality of second filling portions disposed in the plurality of second grooves;
   wherein the second substrate comprises a second base and a light shielding layer disposed on one side of the second base close to the first substrate, the second substrate comprises a second groove structure disposed in the light shielding layer, and one side of the sealant layer away from the first substrate extends into the second groove structure and is attached to the second base;
   wherein the second groove structure comprises a plurality of third grooves, the plurality of third grooves extend through the light shielding layer in a thickness direction of the light shielding layer, and the sealant layer comprises a plurality of third filling portions disposed in the plurality of third grooves; and an orthographic projection of each of the signal lines projected on the second base covers an orthographic projection of one of the third grooves projected on the second base;
   wherein the second groove structure comprises a plurality of fourth grooves, a depth of each of the fourth grooves is less than a thickness of the light shielding layer, and the sealant layer comprises a plurality of fourth filling portions disposed in the plurality of fourth grooves.

2. The display panel according to claim 1, wherein the first groove structure comprises a plurality of first grooves, the first grooves are located between the signal lines, and the sealant layer comprises a plurality of first filling portions disposed in the plurality of first grooves.

3. The display panel according to claim 2, wherein a width of one of the first grooves is equal to an interval between two corresponding adjacent signal lines, and the first filling portions are disposed in the first grooves and in contact with and connected to lateral sides of the signal lines.

4. The display panel according to claim 2, wherein the first groove structure comprises the plurality of first grooves, and each of the first grooves is disposed between two adjacent signal lines.

5. The display panel according to claim 1, wherein an orthographic projection of the fourth grooves projected on the second base does not overlap with the orthographic projection of the signal lines projected on the second base.

6. The display panel according to claim 1, wherein the second substrate comprises a metal layer disposed on one side of the light shielding layer close to the first substrate; and wherein the metal layer extends into the second groove structure and is attached to the second base, the metal layer includes a plurality of concave portions disposed in the second groove structure, and one side of the sealant layer away from the first substrate extends into the plurality of concave portions and is attached to the metal layer.

7. A display device, comprising a display panel and a backlight module combined with the display panel, wherein the display panel comprises:
- a first substrate comprising a first base, a plurality of signal lines disposed on the first base, and an insulating layer disposed on one side of the signal lines away from the first base;
- a second substrate disposed opposite to the first substrate; and
- a sealant layer disposed between the first substrate and the second substrate;

wherein the first substrate comprises a first groove structure extending through the insulating layer in a thickness direction of the insulating layer, and one side of the sealant layer away from the second substrate extends into the first groove structure and is attached to the first base;

wherein the first groove structure comprises a plurality of second grooves, an orthographic projection of each of the signal lines projected on the first base covers an orthographic projection of one of the second grooves projected on the first base, and the sealant layer includes a plurality of second filling portions disposed in the plurality of second grooves;

wherein the second substrate comprises a second base and a light shielding layer disposed on one side of the second base close to the first substrate, the second substrate comprises a second groove structure disposed in the light shielding layer, and one side of the sealant layer away from the first substrate extends into the second groove structure and is attached to the second base;

wherein the second groove structure comprises a plurality of third grooves, the plurality of third grooves extend through the light shielding layer in a thickness direction of the light shielding layer, and the sealant layer comprises a plurality of third filling portions disposed in the plurality of third grooves; and an orthographic projection of each of the signal lines projected on the second base covers an orthographic projection of one of the third grooves projected on the second base;

wherein the second groove structure comprises a plurality of fourth grooves, a depth of each of the fourth grooves is less than a thickness of the light shielding layer, and the sealant layer comprises a plurality of fourth filling portions disposed in the plurality of fourth grooves.

8. The display device according to claim 7, wherein the first groove structure comprises a plurality of first grooves, the first grooves are located between the signal lines, and the sealant layer comprises a plurality of first filling portions disposed in the plurality of first grooves.

9. The display device according to claim 8, wherein a width of one of the first grooves is equal to an interval between two corresponding adjacent signal lines, and the first filling portions are disposed in the first grooves and in contact with and connected to lateral sides of the signal lines.

10. The display device according to claim 8, wherein the first groove structure comprises the plurality of first grooves, and each of the first grooves is disposed between two adjacent signal lines.

11. The display device according to claim 7, wherein an orthographic projection of the fourth grooves projected on the second base does not overlap with the orthographic projection of the signal lines projected on the second base.

12. The display device according to claim 7, wherein the second substrate comprises a metal layer disposed on one side of the light shielding layer close to the first substrate; and
wherein the metal layer extends into the second groove structure and is attached to the second base, the metal layer includes a plurality of concave portions disposed in the second groove structure, and one side of the sealant layer away from the first substrate extends into the plurality of concave portions and is attached to the metal layer.

* * * * *